(12) United States Patent
Okamura et al.

(10) Patent No.: US 12,710,831 B2
(45) Date of Patent: Aug. 18, 2026

(54) CONTROLLER

(71) Applicant: NINTENDO CO., LTD., Kyoto (JP)

(72) Inventors: Takanori Okamura, Kyoto (JP); Gagaku Jinguji, Kyoto (JP); Masaya Takei, Kyoto (JP); Shinta Minagawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 19/281,191

(22) Filed: Jul. 25, 2025

(65) Prior Publication Data

US 2025/0355509 A1 Nov. 20, 2025

Related U.S. Application Data

(63) Continuation of application No. PCT/JP2023/002877, filed on Jan. 30, 2023.

(51) Int. Cl.
*G06F 3/03* (2006.01)
*G06F 3/0338* (2013.01)

(52) U.S. Cl.
CPC .................................. *G06F 3/0338* (2013.01)

(58) Field of Classification Search
CPC ........ A63F 13/24; A63F 13/92; G06F 3/0338; G06F 1/1632
See application file for complete search history.

(56) References Cited

U.S. PATENT DOCUMENTS

| | | | | |
|---|---|---|---|---|
| 2012/0322555 | A1* | 12/2012 | Burgess | A63F 13/24 463/37 |
| 2016/0346681 | A1* | 12/2016 | Tsai | A63F 13/24 |
| 2017/0354869 | A1 | 12/2017 | Suetake et al. | |
| 2017/0368451 | A1 | 12/2017 | Tiffany et al. | |
| 2018/0200617 | A1 | 7/2018 | Tiffany et al. | |
| 2021/0113919 | A1 | 4/2021 | Okamura et al. | |
| 2021/0291038 | A1 | 9/2021 | Guerrero, Jr. et al. | |
| 2023/0398439 | A1 | 12/2023 | Palma Guerrero | |

FOREIGN PATENT DOCUMENTS

| | | | |
|---|---|---|---|
| CN | 107485852 | A | 12/2017 |
| CN | 114177607 | A | 3/2022 |
| JP | 2000105666 | A | 4/2000 |
| JP | 2019160457 | A | 9/2019 |
| JP | 2021064313 | A | 4/2021 |
| TW | 202224737 | A | 7/2022 |

* cited by examiner

*Primary Examiner* — Insa Sadio
(74) *Attorney, Agent, or Firm* — Nixon & Vanderhye PC

(57) ABSTRACT

An example of a controller according to an exemplary embodiment includes a housing including an opening, an input device including a movable member penetrating through the opening in a first direction to inside of the housing, and a contact area that is provided inside the housing. The movable member is configured to be able to be pressed and tilted relative to an axis in the first direction. When the movable member is tilted, the movable member comes into contact with the contact area and is restricted from being further tilted. The contact area is inclined to face the movable member relative to a plane perpendicular to the axis in the first direction.

20 Claims, 9 Drawing Sheets

FIG. 3D 40
41
42(42a)
43
46
46
42(42b)
45
y
x
z

F I G. 4
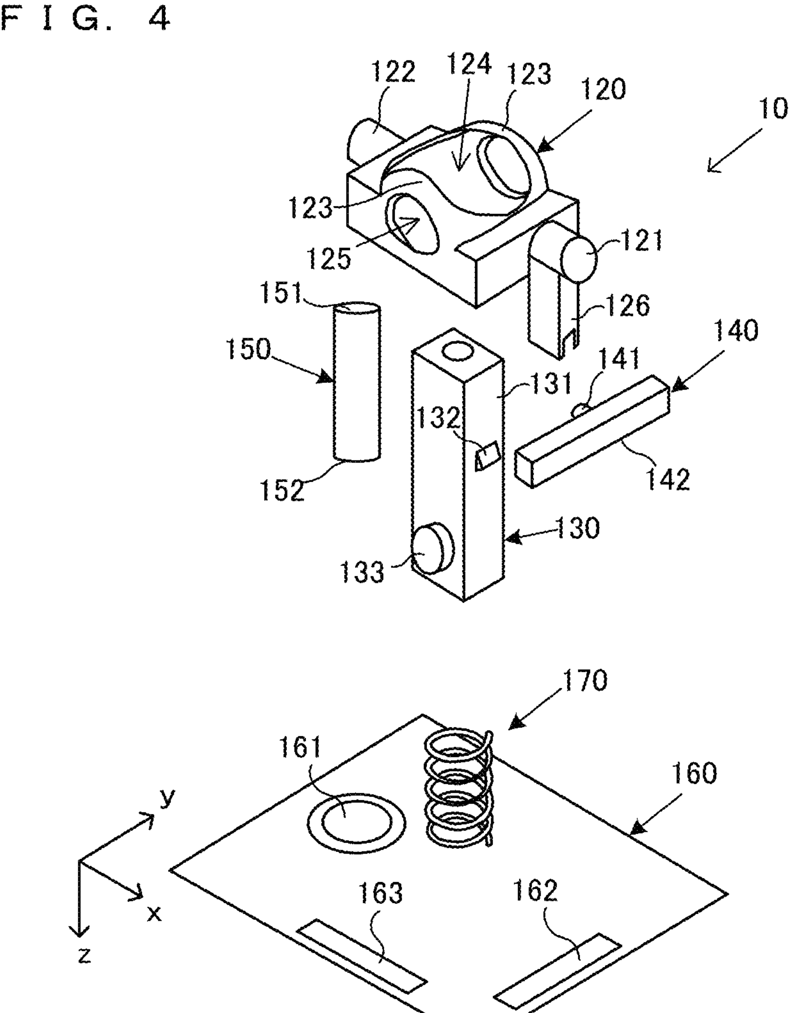

CONTROLLER

CROSS REFERENCE TO RELATED APPLICATION

This application is a continuation of International Patent Application No. PCT/JP2023/002877 filed on Jan. 30, 2023, the entire contents of which is incorporated herein by reference.

FIELD

An exemplary embodiment relates to a controller including a movable member capable of being tilted.

BACKGROUND AND SUMMARY

Conventionally, there is a controller including an operation member capable of being tilted. For example, a controller that restricts the tilt of an operation member by bringing the operation member into contact with a component provided in a housing if the operation member is tilted is proposed.

However, there is room for improvement in the structure of a controller including an operation member capable of being tilted. As an example, there is room for improvement in enhancing the operability of an operation member configured to be able to be tilted and pushed in.

Therefore, an exemplary embodiment discloses a controller that enhances the operability of an operation member capable of being tilted.

The exemplary embodiment employs the following configurations.

First Configuration

A controller according to a first configuration includes: a housing including an opening in a front surface of the housing; an input device including a movable member penetrating through the opening from inside of the housing to the front surface side in a first direction and configured to be pressed and tilted relative to an axis in the first direction; and a contact area that is provided inside the housing, and when the movable member is tilted, comes into contact with the movable member, thereby restricting the movable member from being further tilted. The contact area is inclined toward the movable member side relative to a plane perpendicular to the first direction.

Based on the above, a movable member is configured to be able to be tilted relative to an axis in a first direction and pressed. If the movable member is tilted, the movable member and a contact area provided inside a housing come into contact with each other, thereby restricting the movable member from being further tilted. The contact area is inclined to face the movable member side relative to a plane perpendicular to the first direction. Even when the movable member is tilted and is in contact with the contact area, it is possible to make it easy to press the movable member, and it is possible to enhance operability.

Second Configuration

According to a second configuration, in the above first configuration, the controller may further include: a first member including the contact area on a front surface of the first member; and a second member including a placement area where the first member is placed on a front surface of the second member. An inclination angle of the placement area may be smaller than an inclination angle of the contact area relative to the plane perpendicular to the first direction.

Based on the above, a first member including the above contact area and a second member are different members, whereby, for example, it is possible to vary the materials of the first member and the second member and select a preferable material as the contact area with which the movable member comes into contact. The inclination angle of the second member is smaller than that of the contact area. Thus, it is easy to place the first member on the second member, and it is possible to make a positional shift unlikely to occur.

Third Configuration

According to a third configuration, in the above second configuration, the placement area may be parallel to the plane perpendicular to the first direction.

Based on the above, it is easy to place the first member on the second member, and it is possible to make a positional shift unlikely to occur.

Fourth Configuration

According to a fourth configuration in any of the above first to third configurations, the controller may further include: a first member including the contact area on a front surface of the first member; and a second member including a placement area where the first member is placed on a front surface of the second member. The further away from the movable member a portion of the first member having the contact area may be, the thicker the portion may be.

Based on the above, a first member including the above contact area and a second member are different members, whereby, for example, it is possible to vary the materials of the first member and the second member and select a preferable material as the contact area with which the movable member comes into contact. In the first member, the further away from the movable member a portion including the contact area is, the thicker the portion is. Thus, it is easy to incline the contact area to face the movable member side relative to the plane perpendicular to the first direction.

Fifth Configuration

According to a fifth configuration, in the above first configuration, the controller may further include: a first member including the contact area on a front surface of the first member; and a second member including a placement area where the first member is placed on a front surface of the second member. The placement area may include a first placement area provided on the movable member side and a second placement area provided on a side further away from the movable member than the first placement area. An inclination angle of the first placement area may be smaller than an inclination angle of the second placement area relative to the plane perpendicular to the first direction.

Based on the above, a first member including the above contact area and a second member are different members, whereby, for example, it is possible to vary the materials of the first member and the second member and select a preferable material as the contact area with which the movable member comes into contact. For example, the second member includes a first placement area having a small inclination angle and a second placement area having a great inclination angle, whereby it is easy to place the first member on the second member, and even when the movable member is tilted, it is possible to make it easy to press the movable member.

Sixth Configuration

According to a sixth configuration, in the above fifth configuration, the first member may be bonded to the second member in the first placement area.

Based on the above, the first member is bonded to the second member in the first placement area having a small inclination angle. Thus, it is possible to make it easy to bond the first member to the second member.

Seventh Configuration

According to a seventh configuration, in the above fifth or sixth configuration, the first placement area may be parallel to the plane perpendicular to the first direction.

Based on the above, it is possible to make it easy to place the first member on the second member.

Eighth Configuration

According to an eighth configuration, in any of the above fifth to seventh configurations, the first member may include the contact area on a surface of a portion placed in the second placement area.

Based on the above, in a front surface of the first member, the contact area is provided on the side away from the movable member. Thus, even when the movable member is tilted, it is possible to make it easy to press the movable member.

Ninth Configuration

According to a ninth configuration, in any of the above first to eighth configurations, the controller may further include a frame to which the input device is fixed inside the housing. The frame or a member fixed to the frame may include the contact area.

Based on the above, an input device is fixed to a frame, and the frame or a member fixed to the frame includes the contact area. Thus, it is possible to reduce the influences of the tolerance of components and the tolerance when the components are assembled.

Tenth Configuration

According to a tenth configuration, in the above ninth configuration, the frame may include an opening, and the input device may be fixed to a back surface of the frame so that the movable member penetrates through the opening of the frame.

Based on the above, the movable member is fixed to a back surface of the frame and provided to penetrate through an opening of the frame. Thus, it is possible to make the distance between the movable member and the contact area small. When the movable member is tilted, it is possible to bring the movable member into contact with the contact area.

Eleventh Configuration

According to an eleventh configuration, in the above tenth configuration, the input device may be fastened to the back surface of the frame with a fastening member.

Based on the above, the input device is fastened to the back surface of the frame with a fastening member. Thus, when the movable member is tilted, it is possible to prevent the fastening member from interfering with the movable member.

Twelfth Configuration

According to a twelfth configuration, in any of the above first to eleventh configurations, the movable member may include a first component including an operation surface that is operated by a user and an insertion opening on an opposite side of the operation surface, and a second component including an insertion portion that is inserted into the insertion opening. One of the insertion portion and the insertion opening may include a protrusion, and the other may include a hole portion into which the protrusion is inserted.

Based on the above, it is possible to fix the movable member to an insertion portion, and it is possible to make the movable member unlikely to come out of the insertion portion.

Thirteenth Configuration

According to a thirteenth configuration, in the above twelfth configuration, the insertion opening may include the hole portion, and the hole portion may be formed so that the further in the first direction the hole portion is, the further in a direction away from the movable member the hole portion extends.

Based on the above, even in a case where the movable member is pushed in when the movable member is tilted, it is possible to make the movable member unlikely to come out of the insertion portion.

Fourteenth Configuration

According to a fourteenth configuration, in any of the above first to thirteenth configurations, the movable member may include a shaft portion, and a protruding portion protruding from the shaft portion. The protruding portion may protrude in a direction away from the shaft portion inside the housing, and may be configured to come into contact with the contact area when the movable member is tilted.

Based on the above, a protruding portion of the movable member is brought into contact with the contact area, whereby it is possible to restrict the tilt of the movable member.

Fifteenth Configuration

According to a fifteenth configuration, in the above fourteenth configuration, the further in the first direction the protruding portion may be, the further in a direction away from the shaft portion the protruding portion may extend.

Based on the above, when the movable member is tilted, it is possible to make it easy to bring the protruding portion of the movable member into contact with the contact area inside the housing.

Sixteenth Configuration

According to a sixteenth configuration, in the above fourteenth or fifteenth configuration, the protruding portion may be formed into an umbrella shape.

Based on the above, the umbrella-shaped protruding portion is brought into contact with the contact area, whereby it is possible to restrict the tilt of the movable member.

Seventeenth Configuration

According to a seventeenth configuration, in any of the above second to sixth configurations, the second member may be a frame which is provided inside the housing and to which the input device is fixed.

Based on the above, an input device is fixed to a frame provided inside the housing, and the frame includes the contact area. Consequently, it is possible to restrict the tilt of the movable member of the input device.

According to the exemplary embodiment, even when a movable member is tilted, it is possible to make it easy to push in the movable member.

These and other features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 3D is an example non-limiting cross-sectional view along a line A-A of the operation member 40;

FIG. 4 is an example non-limiting diagram showing an example of the internal structure of a stick module 10;

DETAILED DESCRIPTION OF NON-LIMITING EXAMPLE EMBODIMENTS

With reference to the drawings, a controller 1 according to an exemplary embodiment is described below. For example, the controller 1 according to the exemplary embodiment is connected to a game apparatus (not shown) in a wireless or wired manner and used to perform an operation in a game performed in the game apparatus. The game apparatus to which the controller 1 is connected may be a mobile game apparatus or may be a stationary game apparatus. The controller 1 may be connected not only to a game apparatus but also to any information processing apparatus such as a personal computer, a smartphone, or a tablet terminal and used to perform an operation in a game performed using the information processing apparatus. The controller 1 may be used not only to perform a game operation but also to operate an information processing apparatus.

Figure 1:
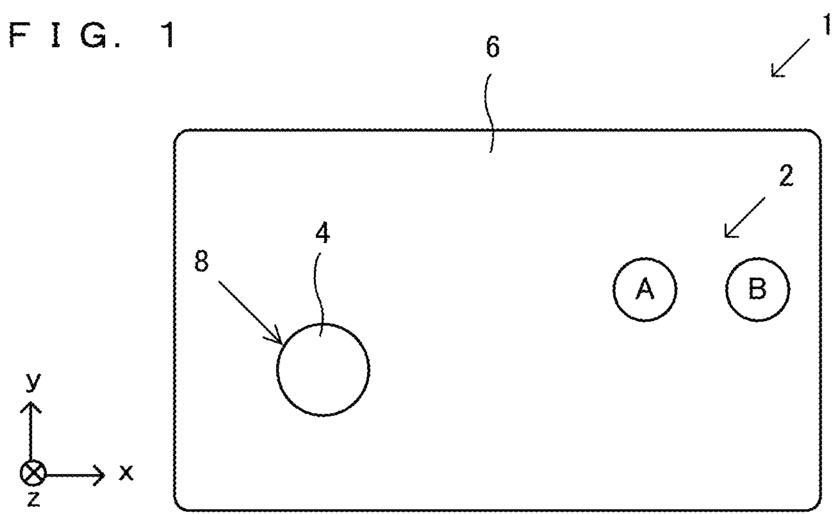
FIG. 1 is an example non-limiting front view of a controller 1.
Figure 2:
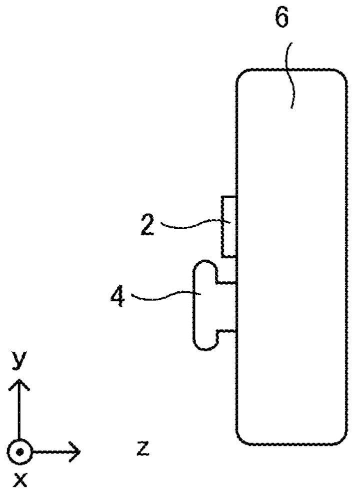
FIG. 2 is an example non-limiting right side view of the controller 1.

FIG. 1 is an example of a front view of the controller 1. FIG. 2 is an example of a right side view of the controller 1. An xyz coordinate system in FIGS. 1 and 2 is a coordinate system based on the controller 1. The direction from a front surface to a back surface of the controller 1 (e.g., the direction of pressing buttons 2) is defined as a z-axis direction. Then, a plane perpendicular to the z-axis direction is defined as an xy plane, the right direction relative to the front surface of the controller 1 (e.g., the direction from an A-button to a B-button) is defined as an x-axis direction, and the up direction relative to the front surface of the controller 1 is defined as a y-axis direction.

As shown in FIG. 1, the controller 1 includes a housing 6. For example, the housing 6 is composed of a front surface side housing member that forms the front surface side of the controller 1 and a back surface side housing member that forms the back surface side of the controller 1. For example, the housing 6 may be formed of plastic. The housing 6 may be formed of, for example, an ABS resin, a polycarbonate ABS resin, an acrylic ABS resin, or the like, or may be formed of a polymer alloy including at least two of materials including these materials and other materials.

In a front surface of the housing 6, an opening 8 for exposing a key top of an analog stick 4 is provided. In the front surface of the housing 6, an opening for exposing each of the plurality of buttons 2 is provided.

As shown in FIG. 1, in a right area of the front surface of the housing 6, the two buttons (the A-button and the B-button) 2 are provided. The buttons 2 are configured to be able to be pressed in a direction perpendicular to the front surface of the housing 6 (the z-axis direction). The two buttons 2 are buttons used for a game operation. In the controller 1, a plurality of buttons may also be provided in addition to these buttons.

In a left area of the front surface of the housing 6, the analog stick 4 is provided. The analog stick 4 is an example of an input device for inputting a direction and is configured to be able to be tilted in any direction (any direction parallel to the xy plane). The analog stick 4 is also configured to be able to be pressed in the positive z-axis direction. The details of the analog stick 4 will be described below. A plurality of analog sticks 4 may be provided.

The controller 1 is operated by being held by both hands of a user. For example, the analog stick 4 is operated using the thumb of the left hand, and the buttons 2 are operated using the thumb of the right hand. The controller 1 may include left and right grips that are held by the left and right hands of the user.

(Description of Analog Stick)

The analog stick 4 includes an operation member 40, at least a part of which is exposed to outside the housing 6 and which is operated by being touched by the user, and a stick module 10 provided inside the housing 6. The stick module 10 senses a tilt direction (an input direction) and also at least senses the pressing of the operation member 40.

Figure 3A:
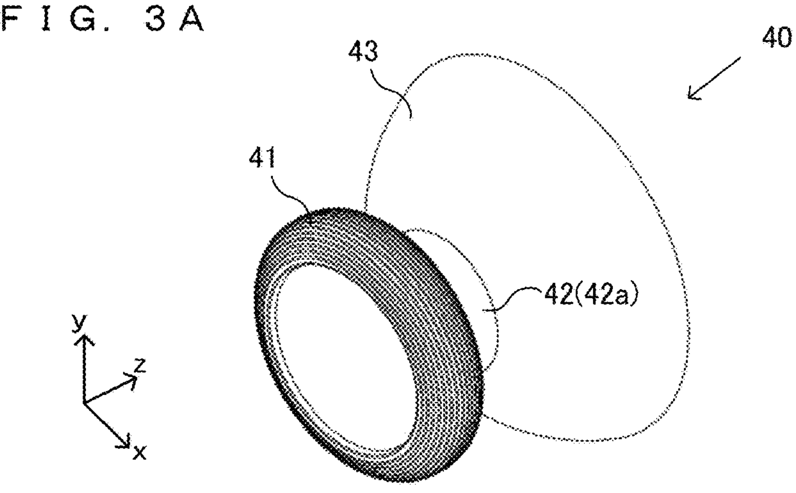
FIG. 3A is an example non-limiting perspective view of an operation member 40.
Figure 3B:
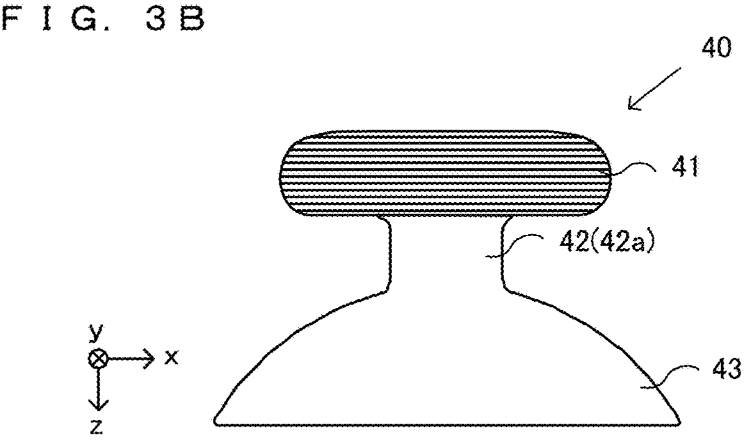
FIG. 3B is an example non-limiting side view of the operation member 40.
Figure 3C:
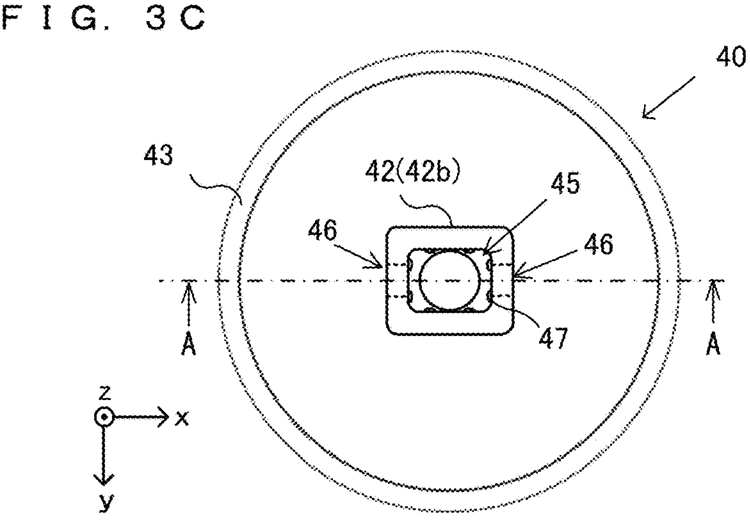
FIG. 3C is an example non-limiting rear view of the operation member 40.
Figure 3D:
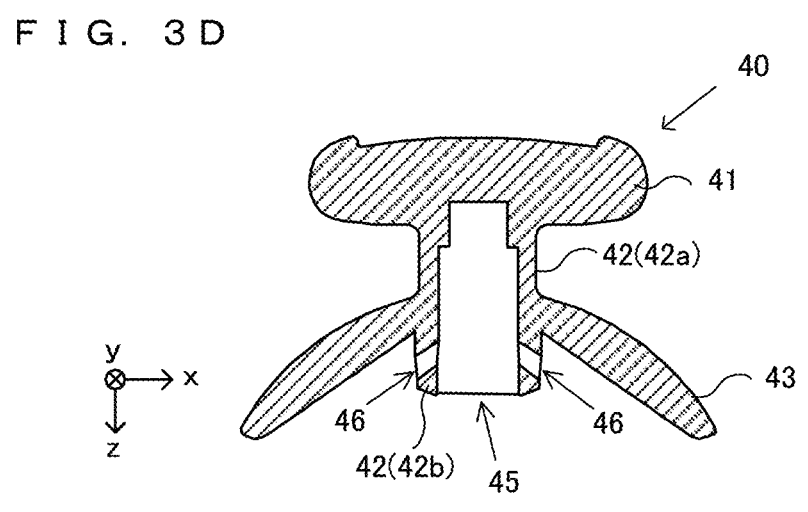

FIG. 3A is an example of a perspective view of the operation member 40. FIG. 3B is an example of a side view of the operation member 40. FIG. 3C is an example of a rear view of the operation member 40. FIG. 3D is an example of a cross-sectional view along a line A-A of the operation member 40.

As shown in FIGS. 3A and 3B, the operation member 40 includes a key top 41, a shaft portion 42, and a protruding portion 43. The key top 41 is exposed to the front surface of the housing 6 and is a portion to be mainly touched by the user. As an example, the shape of the key top 41 is a circular shape when the controller 1 is viewed from the front surface. The key top 41 may have another shape.

The shaft portion 42 is formed to extend downward from the key top 41 (in the direction in which the buttons 2 of the controller 1 are pressed; the positive z-axis direction). In the exemplary embodiment, a part of the shaft portion 42 is exposed from the housing 6. The shaft portion 42 penetrates through an opening 9 provided in the front surface of the housing 6 and extends in the direction from the front surface of the housing 6 to the inside of the housing 6.

On a side surface of the shaft portion 42, a protruding portion 43 protruding in a direction away from the shaft portion 42 is formed. The protruding portion 43 is formed so that the further downward the protruding portion 43 is, the further away from the shaft portion 42 the protruding portion extends. For example, the protruding portion 43 has an umbrella shape. In another example, the protruding portion 43 may have a stepped shape.

In the shaft portion 42, a shaft upper portion 42*a* that is a portion above a portion where the protruding portion 43 protrudes, and a shaft lower portion 42*b* that is a portion below the portion where the protruding portion 43 protrudes may have different external shapes (see FIGS. 3C and 3D). For example, the external shape of the shaft upper portion 42*a* is formed into a columnar shape. For example, the external shape of the shaft lower portion 42*b* may be a cuboid shape, and may be formed of four wall portions opposed to each other. The external shape of the shaft upper portion 42*a* and the external shape of the shaft lower portion 42*b* may be the same as each other. The inside of the shaft portion 42 is a rectangle in cross section and hollow, and a lower end of the shaft portion 42 (a lower end of the shaft lower portion 42*b*) opens. A shaft portion 131 of the stick module 10 described below (see FIG. 4) is inserted into an opening 45 at the lower end of the shaft portion 42, whereby the operation member 40 is fixed to the stick module 10.

Although the details will be described below, if the operation member 40 is fixed to the shaft portion 131 of the stick module 10, and the user provides an input (a direction input or a push-in input), the operation member 40 and the shaft portion 131 move. Specifically, if the user provides a direction input of a direction parallel to the xy plane, the operation member 40 and the shaft portion 131 are tilted. If the user provides a push-in input of the z-axis direction, the operation member 40 and the shaft portion 131 move in the z-axis direction. Here, the operation member 40 and the shaft portion 131 that move by an input provided by the user are occasionally referred to as a "movable member".

In each of two wall portions opposed to each other among the four wall portions forming the shaft lower portion 42*b* of the shaft portion 42, a hole portion 46 is formed. The hole portions 46 are formed to extend in the x-axis direction and the z-axis direction. If the operation member 40 is fixed to the stick module 10, retention portions 132 of the shaft portion 131 described below are placed in the hole portions 46. This can make the operation member 40 unlikely to come out of the stick module 10. A hole portion 46 may be provided in each of the four wall portions. In this case, in the shaft portion 131, a retention portion 132 is provided at a position corresponding to each of the four hole portions 46. In the exemplary embodiment, since the protruding portion 43 is located above the hole portions 46, the hole portions 46 or the retention portions 132 penetrating through the hole portions 46 are unlikely to be viewed from outside.

On an inner surface of the shaft portion 42, a plurality of ribs 47 are provided. For example, a rib 47 is provided on an inner surface of each of the four wall portions forming the shaft lower portion 42*b*. The rib 47 comes into contact with the shaft portion 131 of the stick module 10 and fixes the operation member 40 to the shaft portion 131 of the stick module 10.

(Internal Structure of Stick Module)

Next, the structure of the stick module 10 is described. FIG. 4 is a diagram showing an example of the internal structure of the stick module 10.

As shown in FIG. 4, the stick module 10 includes an actuator 120, a lever 130, a slide portion 140, a pressing portion 150, and a bottom surface portion 160. Although FIG. 4 only shows a structure for detecting an input of the y-axis direction and omits a structure for detecting an input of the x-axis direction, the stick module 10 can include a similar actuator, a similar lever, and a similar slide portion.

The actuator 120 includes a shaft portion 121 in an end portion in the positive x-axis direction and a shaft portion 122 in an end portion in the negative x-axis direction. The shaft portion 121 and the shaft portion 122 are supported to be rotationally movable about the x-axis by a housing 11 of the stick module 10.

In a central portion of the actuator 120, a through-hole 124 penetrating through the actuator 120 in the z-axis direction is provided. The through-hole 124 is formed to be longer in the x-axis direction than in the y-axis direction. A shaft portion 131 of the lever 130 penetrates through the through-hole 124 and is exposed through an upper portion of the actuator 120.

The actuator 120 also includes shaft contact portions 123 in the positive y-axis direction and the negative y-axis direction of the through-hole 124.

Near the shaft portion 121 of the actuator 120, a drive transmission portion 126 extending in the z-axis direction is provided. To an end portion in the z-axis direction of the drive transmission portion 126, a protrusion portion 141 of a slide portion 140 is connected. Below the slide portion 140, a resistance layer 162 provided in the bottom surface portion 160 and long in the y-axis direction is placed. In a lower end portion of the slide portion 140, a movable electrode (not shown) that comes into contact with the resistance layer 162 is provided.

To the shaft portion 122 of the actuator 120, an upper end portion 151 of the pressing portion 150 is connected, and the pressing portion 150 is provided extending in the z-axis direction. Below a lower end portion 152 of the pressing portion 150, a switch portion 161 provided in the bottom surface portion 160 is placed. When the pressing portion 150 is not pressed, there is a predetermined gap between the lower end portion 152 of the pressing portion 150 and the switch portion 161.

When the shaft portion 131 of the lever 130 is not operated by the user, the shaft portion 131 of the lever 130 extends parallel to the z-axis, and the shaft portion 131 of the lever 130 is configured to be able to be tilted relative to the z-axis in accordance with an operation of the user.

On a side surface of the shaft portion 131 of the lever 130, a retention portion 132 protruding in the side surface direction is provided. A retention portion 132 is also provided on a side surface on the opposite side of the side surface of the shaft portion 131 shown in FIG. 4. If the operation member 40 is attached to the shaft portion 131, the retention portions 132 are provided at positions that match the hole portions 46 of the operation member 40. The retention portions 132 are formed to protrude in the side surface direction and the z-axis direction similarly to the shape of the hole portion 46. Consequently, when the operation member 40 is inserted into the shaft portion 131, the retention portions 132 are unlikely to become caught on the hole portions 46, and the operation member 40 is easily inserted, and when the operation member 40 is pulled out of the shaft portion 131, the retention portions 132 become caught on the hole portions 46, and the operation member 40 is unlikely to come out.

In a lower portion of the lever 130, projection portions 133 are provided on the sides in the positive y-axis direction and the negative y-axis direction. In the actuator 120, a through-hole 125 penetrating through the actuator 120 in the y-axis direction is provided. The projection portions 133 of the lever 130 are placed in the through-hole 125 of the actuator 120. If the shaft portion 131 of the lever 130 is tilted in the positive x-axis direction or the negative x-axis direction, the lever 130 pivots about the projection portions 133.

At a lower end of the lever 130, an opening for inserting a spring 170 is provided, and the spring 170 is inserted into the opening. The spring 170 biases the lever 130 upward.

Here, a description is given of the operations of the components of the actuator 120 in a case where the components are assembled, and the shaft portion 131 of the lever 130 is tilted.

For example, if the shaft portion 131 of the lever 130 is tilted in the positive y-axis direction or the negative y-axis direction, the shaft portion 131 comes into contact with the shaft contact portions 123 of the actuator 120, and the actuator 120 pivots about a rotational axis along the shaft portion 121 and the shaft portion 122. By this pivot of the actuator 120, the drive transmission portion 126 pivots. To the end portion in the z-axis direction of the drive transmission portion 126, the protrusion portion 141 of the slide portion 140 is connected. By the pivot of the drive transmission portion 126, the slide portion 140 slides in the negative y-axis direction or the positive y-axis direction. Consequently, the contact position of the movable electrode provided in the lower end portion of the slide portion 140 and the resistance layer 162 changes, and the resistance value changes. By detecting this resistance value, it is possible to detect the presence or absence of an input of the positive y-axis direction or the negative y-axis direction and the input amount (the tilt amount). If the shaft portion 131 of the lever 130 is tilted in the positive x-axis direction or the negative x-axis direction, the lever 130 pivots about the projection portions 133 in the positive x-axis direction or the negative x-axis direction, but the shaft portion 131 does not contact the shaft contact portions 123 of the actuator 120, and the actuator 120 does not pivot.

Although the structure for detecting an input of the y-axis direction has been described here, the structure for detecting an input of the x-axis direction is also similar to the above. That is, although not shown, the stick module 10 includes a second actuator supported to be pivotable about the y-axis, and a second slide portion connected to the second actuator and slidable in the positive x-axis direction or the negative x-axis direction. The second actuator has a shape similar to that of the actuator 120 and is provided to intersect the actuator 120. If the shaft portion 131 of the lever 130 is tilted in the positive x-axis direction or the negative x-axis direction, the second actuator pivots about the y-axis. By this pivot of the second actuator, the second slide portion slides in the negative x-axis direction or the positive x-axis direction. In a lower end portion of the second slide portion, a movable electrode is provided. The second slide portion slides, whereby the contact position of the movable electrode and a resistance layer 163 changes, and the resistance value changes. By detecting this change in the resistance value, an input of the positive x-axis direction or the negative x-axis direction is detected.

That is, if the shaft portion 131 of the lever 130 is tilted in the positive x-axis direction or the negative x-axis direction, only the second actuator pivots, the second slide portion slides in the negative x-axis direction or the positive x-axis direction, and an input of the positive x-axis direction or the negative x-axis direction is detected. On the other hand, if the shaft portion 131 of the lever 130 is tilted in the positive y-axis direction or the negative y-axis direction, only the actuator 120 pivots, the slide portion 140 slides in the negative y-axis direction of the positive y-axis direction, and an input of the positive y-axis direction or the negative y-axis direction is detected. If the shaft portion 131 of the lever 130 is tilted in both the x-axis direction and the y-axis direction, each of the actuator 120 and the second actuator pivots, the slide portion of each of the actuators move, and inputs of the x-axis direction and the y-axis direction are detected.

Figure 5A:
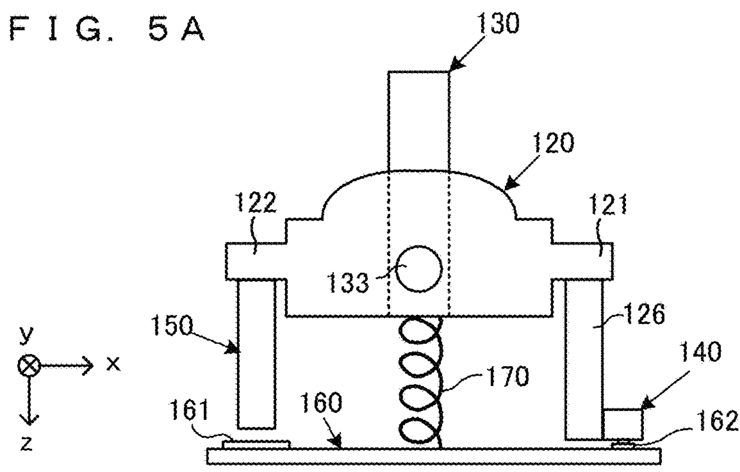
FIG. 5A is an example non-limiting schematic diagram of the stick module 10 in the state where a lever 130 is not pushed in in a positive z-axis direction.
Figure 5B:
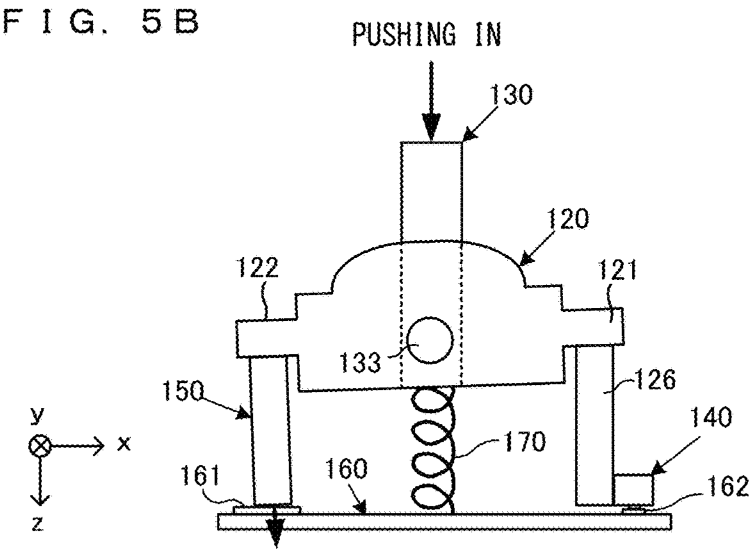
FIG. 5B is an example non-limiting schematic diagram of the stick module 10 in the state where the lever 130 is pushed in in the positive z-axis direction.
Figure 5C:
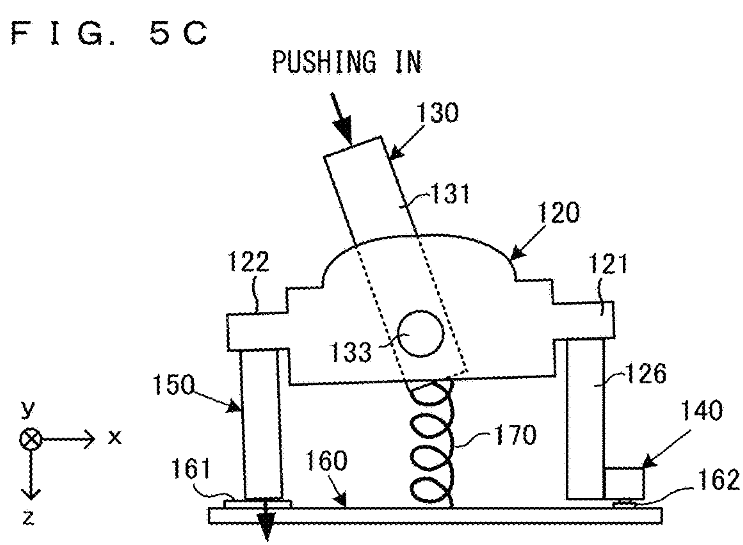
FIG. 5C is an example non-limiting schematic diagram of the stick module 10 when the lever 130 is pushed in in the positive z-axis direction in the state where the lever 130 is tilted in a negative x-axis direction.

Next, the pushing in of the lever 130 is described. FIG. 5A is an example of a schematic diagram of the stick module 10 in the state where the lever 130 is not pushed in in the positive z-axis direction. FIG. 5B is an example of a schematic diagram of the stick module 10 in the state where the lever 130 is pushed in in the positive z-axis direction. FIG. 5C is an example of a schematic diagram of the stick module 10 when the lever 130 is pushed in in the positive z-axis direction in the state where the lever 130 is tilted in the negative x-axis direction.

As shown in FIG. 5A, in the state where the lever 130 is not pushed in in the positive z-axis direction, the lever 130 is biased in the negative z-axis direction by the spring 170, and the switch portion 161 is not pressed by the pressing portion 150. If the lever 130 is pushed in in the positive z-axis direction, as shown in FIG. 5B, a force in the positive z-axis direction is applied to the lever 130, the force in the positive z-axis direction is applied to the actuator 120 through the projection portions 133 of the lever 130, and the lever 130 and the actuator 120 move in the positive z-axis direction. Specifically, the lever 130 and the actuator 120 pivot in the positive z-axis direction with the shaft portion 121 as the pivot point. As described above, if the lever 130 is pushed in in the positive z-axis direction, the shaft portion 131 is slightly tilted relative to the z-axis, but moves approximately in the z-axis direction. Consequently, the pressing portion 150 moves in the positive z-axis direction, the switch portion 161 is pressed by the pressing portion 150, and the switch portion 161 senses the pushing in of the lever 130. In this state, the spring 170 contracts, and a restoring force is generated in the negative z-axis direction. If the push-in force in the positive z-axis direction on the lever 130 ceases to exist, the lever 130 is pushed up in the negative z-axis direction by the restoring force and returns to the original state.

As shown in FIG. 5C, the stick module 10 is configured to be able to push in the lever 130 in the z-axis direction in the state where the lever 130 is tilted. If the lever 130 is pushed in downward in the state where the lever 130 is tilted by a predetermined tilt angle, the lever 130 and the actuator 120 move downward. Specifically, the lever 130 pivots in the positive z-axis direction with the shaft portion 121 as the pivot point while remaining tilted. As a result, the lever 130 moves in a direction between the z-axis direction and the direction along the shaft portion 131. Consequently, even in the state where the lever 130 is tilted, the pressing portion 150 moves in the z-axis direction, and the switch portion 161 is pressed by the pressing portion 150.

(Structure for Restricting Tilt of Movable Member)

First Exemplary Embodiment

Next, a description is given of a structure for restricting the tilt of the operation member 40 in a case where the operation member 40 is attached to the stick module 10.

Figure 6:
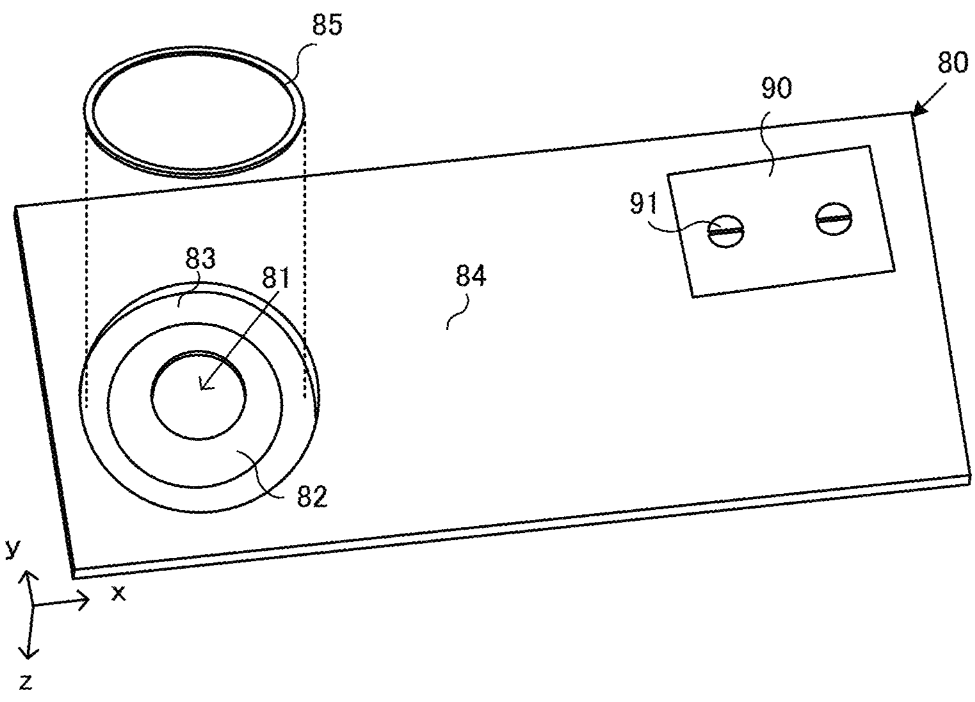
FIG. 6 is an example non-limiting perspective view of a frame 80 provided inside a housing 6 of the controller 1 when viewed from the front surface side.

FIG. 6 is an example of a perspective view of a frame 80 provided inside the housing 6 of the controller 1 when viewed from the front surface side. The frame 80 is formed of a resin material, and for example, may be formed of the same material as that of the housing 6. The frame 80 is fixed to the inside of the housing 6 so that a front surface 84 of the frame 80 is parallel the xy plane, and the front surface 84 faces in the negative z-axis direction.

At a position in the frame 80 corresponding to the analog stick 4, an opening 81 is provided. Around the opening 81, a wall portion 82 having a curved surface shape bulging in the negative z-axis direction is formed. The surface of the wall portion 82 is formed into an umbrella surface shape and formed so that the surface of the wall portion 82 is along the protruding portion 43 of the operation member 40 in a case where the operation member 40 is tilted. The surface of the wall portion 82 may have any shape so long as the surface of the wall portion 82 does not interfere with the protruding portion 43. The wall portion 82 bulging in the negative z-axis direction may not be provided.

Around the wall portion 82, an annular placement surface 83 is formed. The placement surface 83 is formed parallel to the front surface 84 of the frame 80 and formed parallel to the xy plane. The placement surface 83 is formed to be recessed relative to the front surface 84 around the placement surface 83. That is, the placement surface 83 is located further in the z-axis direction than the front surface 84 around the placement surface 83. On the front surface 84, a flexible printed circuit board 90 is placed. That is, the placement surface 83 is located further in the z-axis direction than the flexible printed circuit board 90 placed in the frame 80. The placement surface 83 may be formed to project relative to the front surface 84 around the placement surface 83. The placement surface 83 may be located further in the negative z-axis direction than the flexible printed circuit board.

On the placement surface 83, a sheet 85 is placed. The sheet 85 is an example of a member having on its surface a contact area with which the protruding portion 43 comes into contact. The sheet 85 is formed into a ring shape. The sheet 85 is composed of a material having higher sliding properties and wear resistance than the frame 80. For example, the sheet 85 may be composed of rigid urethane foam. As the material of the sheet 85, for example, silicone, urethane foam, foamed polyethylene, high-density polyethylene, or nylon may be used. For example, the sheet 85 may be fixed to the placement surface 83 with an adhesive, an adhesive tape, or the like, or may be latched by a latch portion provided on the placement surface 83.

On the front surface 84 of the frame 80, the flexible printed circuit board 90 is placed. Specifically, at positions in the front surface 84 of the frame 80 corresponding to the buttons 2, the flexible printed circuit board 90 is placed. For example, on the front surface 84 of the frame 80, a latch portion for latching the flexible printed circuit board 90 is provided. On the flexible printed circuit board 90, switches 91 are placed at the positions corresponding to the buttons 2. If the frame 80 including the flexible printed circuit board 90 is provided inside the housing 6, and a predetermined button is pressed, the button comes into contact with the switch 91, and the pressing of the button is sensed.

Although not shown in the figures, on the back surface side (the side in the z-axis direction) of the frame 80 inside the housing 6, a substrate on which various control circuits for controlling the controller 1 are provided is placed. The substrate is electrically connected to the stick module 10 and the flexible printed circuit board 90. The control circuits generate operation data according to an operation on each of the buttons 2 and the analog stick 4 of the controller 1 and transmits the operation data to the game apparatus. The frame 80 may be formed to be larger than the substrate.

Figure 7:
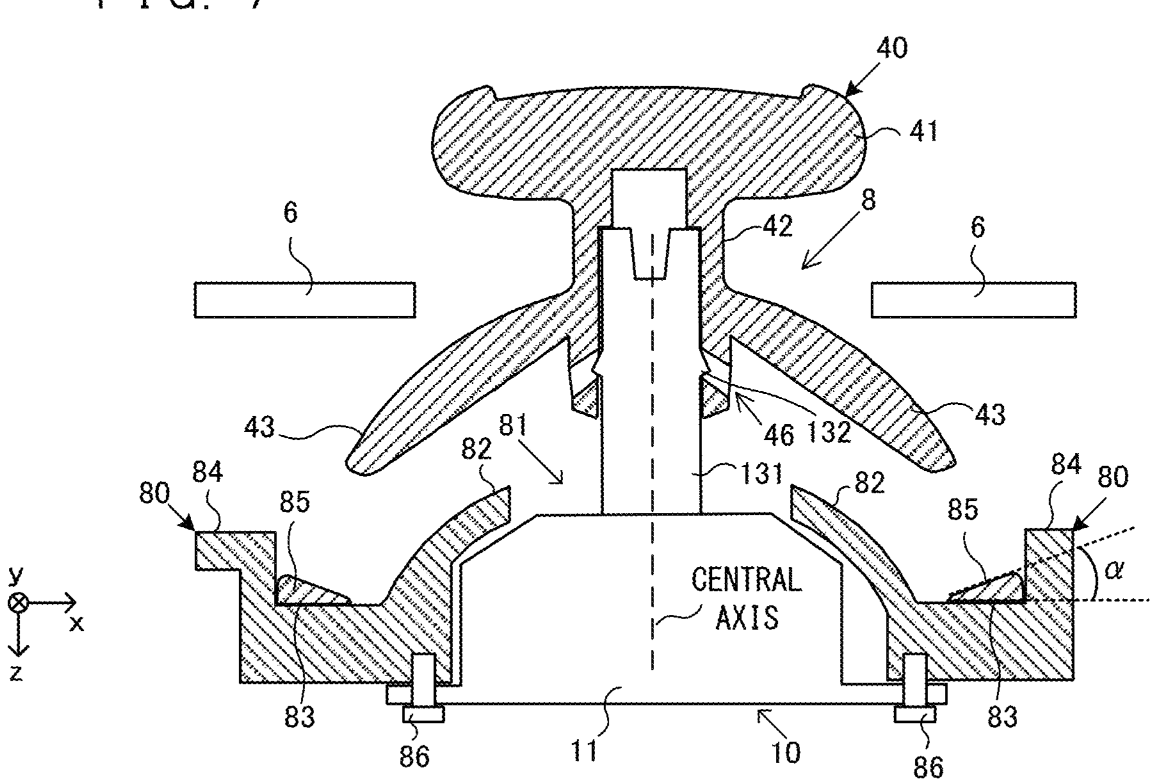
FIG. 7 is an example non-limiting cut section end view when the controller 1 including an analog stick 4 is cut at a plane parallel to an xz plane.

FIG. 7 is an example of a cut section end view when the controller 1 including the analog stick 4 is cut at a plane parallel to the xz plane. FIG. 7 shows only a part of the cut section end view and shows only portions necessary for the description.

As shown in FIG. 7, the stick module 10 is attached from the back surface side of the frame 80 so that the shaft portion 131 of the stick module 10 penetrates through the opening 81 of the frame 80. The wall portion 82 is formed to bulge in the negative z-axis direction. Consequently, a space is formed on the back surface side of the wall portion 82. In this space, a part of the housing of the stick module 10 is accommodated. The shaft portion 131 is exposed through an upper end of the housing 11 of the stick module 10. The upper end of the housing 11 of the stick module 10 is located further in the negative z-axis direction than the placement surface 83. A lower end of the housing 11 of the stick module 10 is located further in the z-axis direction than the placement surface 83. In a lower end portion of the housing 11 of the stick module 10, a flange protruding in the x-axis direction or the y-axis direction is provided, and screw holes are provided in the flange. On the back surface of the frame 80, screw holes are provided at positions corresponding to the screw holes of the flange. Screws 86 are inserted from the back surface side of the frame 80 to penetrate through these screw holes and are fastened. Consequently, the stick module 10 is fixed to the frame 80. The stick module 10 is attached to the frame 80 so that a central axis passing through the center of the shaft portion 131 is parallel to the z-axis when the stick module 10 is not tilted. To the shaft portion 131, the operation member 40 is attached. The key top 41 of the operation member 40 is exposed through the opening 9 of the housing 6.

As shown in FIG. 7, the sheet 85 is formed so that the outer diameter side of the sheet 85 is thicker than the inner diameter side of the sheet 85. In other words, the sheet 85 is formed so that the further away from the operation member 40 the sheet 85 is, the thicker the sheet 85 is. The sheet 85 is placed on the placement surface 83 parallel to the xy plane. If the sheet 85 is placed on the placement surface 83, a front surface of the sheet 85 is inclined by a predetermined inclination angle α relative to the plane perpendicular to the z-axis direction (the xy plane). That is, the front surface of the sheet 85 is inclined to face the shaft portion 131 parallel to the z-axis.

(Operations when Operation Member 40 is Tilted)

Figure 8:
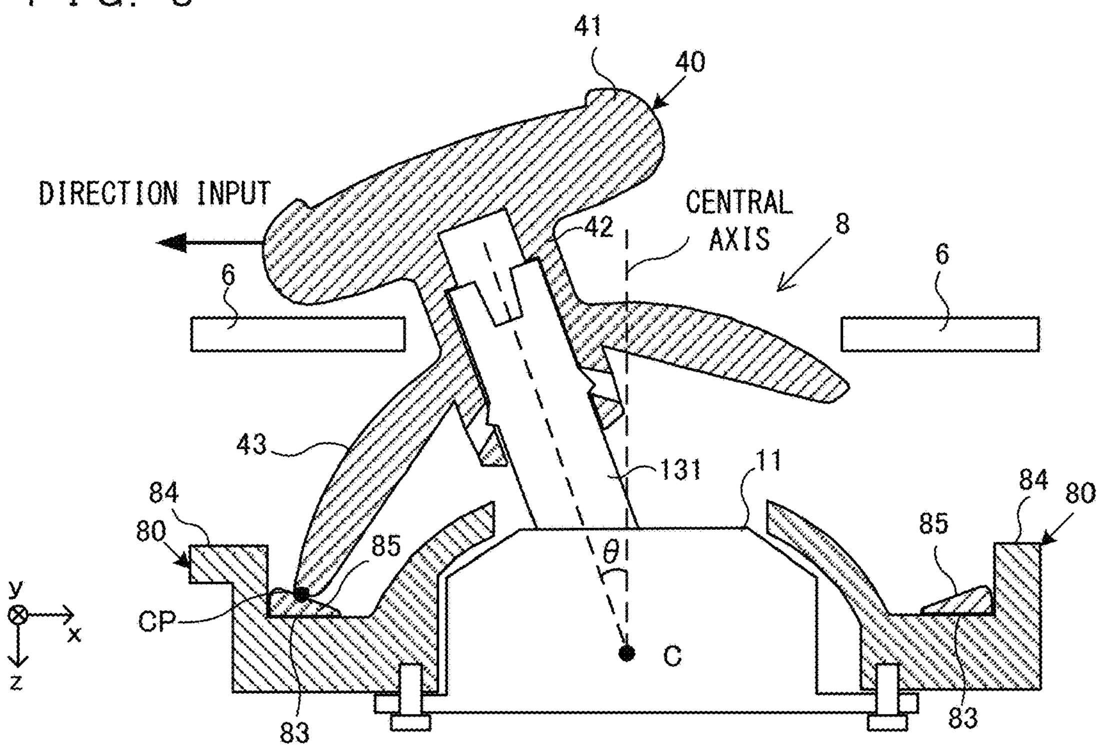
FIG. 8 is an example non-limiting cut section end view when the controller 1 is cut at a plane parallel to the xz plane in a case where an operation member 40 is tilted.

Next, a description is given of the operations of the components when the operation member 40 is tilted. FIG. 8 is an example of a cut section end view when the controller 1 is cut at a plane parallel to the xz plane in a case where the operation member 40 is tilted.

As shown in FIG. 8, for example, if a force in the negative x-axis direction is applied to the key top 41, the operation member 40 and the shaft portion 131 (examples of the movable member) tilt in the negative x-axis direction relative to the central axis (a straight line passing through the center of the shaft portion 131 and parallel to the z-axis when the operation member 40 is not tilted). If the operation member 40 is tilted, the shaft portion 42 of the operation member 40 comes close to the periphery of the opening 9 of the housing 6. If the operation member 40 is tilted, the protruding portion 43 moves along a virtual spherical surface centered at a point C in the stick module 10, and an extremity of the protruding portion 43 comes close to the placement surface 83 of the frame 80 and the sheet 85. If the operation member 40 is tilted by a tilt angle θ (e.g., 20 degrees), the operation member 40 comes into contact with the front surface of the sheet 85. Specifically, if the operation member 40 is tilted by the tilt angle θ, an extremity portion of the protruding portion 43 of the operation member 40 comes into contact with the sheet 85 at a contact point CP on the side in the tilt direction. The contact point CP is a part of the contact area. By this contact between the extremity portion of the protruding portion 43 and the sheet 85, the operation member 40 is restricted from being further tilted in the negative x-axis direction. Thus, the tilt angle θ is the maximum tilt angle. At this time, the operation member 40 does not come into contact with the housing 6. That is, when the extremity portion of the protruding portion 43 and the sheet 85 come into contact with each other in the tilt direction, the key top 41, the shaft portion 42, and the protruding portion 43 of the operation member 40 do not come into contact with the periphery of the opening 9 of the housing 6 on the side in the tilt direction. When the extremity portion of the protruding portion 43 and the sheet 85 come into contact with each other in the tilt direction, the protruding portion 43 of the operation member 40 does not come into contact with the inside of the housing 6 on the opposite side of the tilt direction (the right side in FIG. 8). That is, if the operation member 40 tilts in a predetermined direction, the extremity portion of the protruding portion 43 on the side in the predetermined direction moves in the z-axis direction and comes into contact with the sheet 85. At this time, the protruding portion 43 on the opposite side of the predetermined direction is lifted in the negative z-axis direction and comes close to the housing 6, but does not come into contact with the housing 6. When the extremity portion of the protruding portion 43 and the sheet 85 come into contact with each other in the tilt direction, the protruding portion 43 of the operation member 40 does not come into contact with another member in the housing 6 on the opposite side of the tilt direction. In the state where the operation member 40 is tilted by the maximum tilt angle θ, and the protruding portion 43 and the sheet 85 are in contact with each other, a force in the tilt direction may be further applied, whereby the sheet 85 may deform, and the operation member 40 may further tilt albeit only slightly from the maximum tilt angle θ. That is, the maximum tilt angle θ can also be said to be the angle at which the tilt of the operation member starts to be restricted by the sheet 85.

When the extremity portion of the protruding portion 43 and the sheet 85 come into contact with each other, the operation member 40 may come into contact with the housing 6. For example, when the extremity portion of the protruding portion 43 and the sheet 85 come into contact with each other, the shaft portion 42 of the operation member 40 may come into contact with the periphery of the opening 9 of the housing 6 on the side in the tilt direction. When the extremity portion of the protruding portion 43 and the sheet 85 come into contact with each other, the protruding portion 43 may come into contact with the inside of the housing 6 on the opposite side of the tilt direction (the right side in FIG. 8). Also in this case, by the contact between the extremity portion of the protruding portion 43 and the sheet 85, the operation member 40 is restricted from being further tilted in the negative x-axis direction. That is, when the extremity portion of the protruding portion 43 and the sheet 85 come into contact with each other, and even if the operation member 40 and the housing 6 (or another member) come into contact with each other, a force greater than that between the operation member 40 and the housing 6 (or another member) is applied between the extremity portion of the protruding portion 43 and the sheet 85. By the contact between the extremity portion of the protruding portion 43 and the sheet 85, the tilt of the operation member 40 is restricted.

Unlike the front surface of the sheet 85, the extremity portion of the protruding portion 43 is rounded. The rounded extremity portion of the protruding portion 43 comes into contact with the planar sheet 85, whereby it is possible to improve operability. The extremity portion of the protruding portion 43 may be formed into a planar surface, and the planar extremity portion and the sheet 85 may come into surface contact with each other.

The maximum tilt angle θ of the operation member 40 when the stick module 10 including the operation member 40 is fixed to the frame 80 may be smaller than or the same as the maximum tilt angle of the shaft portion 131 of the stick module 10 itself.

Figure 9:
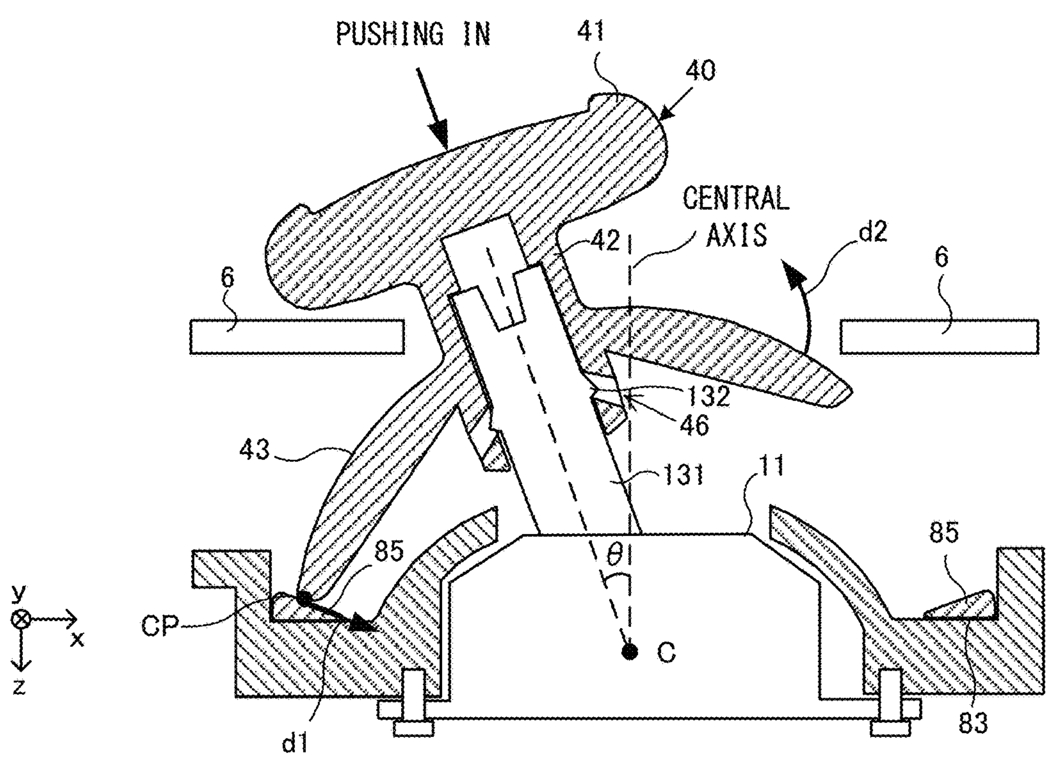
FIG. 9 is an example non-limiting schematic diagram showing the motions of components when the operation member 40 is pushed in in the state where the operation member 40 is tilted.

Next, a description is given of the operations when the operation member 40 is pushed in in the state where the operation member 40 is tilted. FIG. 9 is a schematic diagram showing the motions of the components when the operation member 40 is pushed in in the state where the operation member 40 is tilted.

As shown in FIG. 9, for example, if the operation member 40 is pushed in in the direction along the shaft portion 131 in the state where the operation member 40 is tilted in the negative x-axis direction, as described with reference to FIG. 5C, the operation member 40 and the shaft portion 131 are going to move in a direction between the z-axis direction and the direction along the shaft portion 131. A force to move in this direction is dispersed in a direction d1 along the front surface of the sheet 85 at the contact point CP. Consequently, the operation member 40 moves in the direction d1 on the contact area that is the front surface of the sheet 85. Thus, it is possible to make resistance against the push-in force small. Even in the state where the operation member 40 and the shaft portion 131 tilt and the protruding portion 43 is in contact with the sheet 85, it is possible to easily push down the operation member 40 and the shaft portion 131. The operation member 40 and the shaft portion 131 are pushed down, whereby the switch portion 161 in the stick module 10 is pressed as described above.

In a case where the sheet 85 is not placed on the placement surface 83, and when the operation member 40 is tilted, the operation member 40 comes into contact with the placement surface 83 parallel to the xy plane. In this case, it is more difficult to push in the operation member 40 than in a case where the sheet 85 is mounted.

Figure 10:
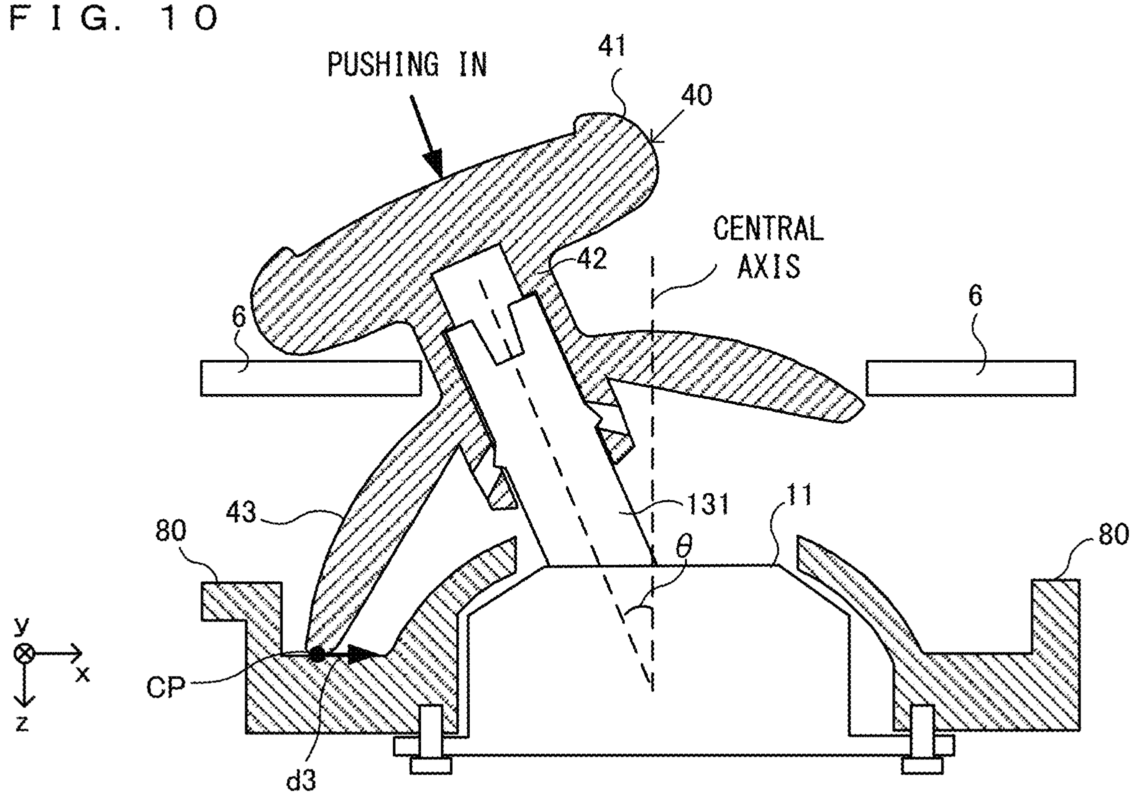
FIG. 10 is an example non-limiting schematic diagram showing the motions of the components when the operation member 40 is pushed in in the state where the operation member 40 is tilted in a case where a sheet 85 is not placed on a placement surface 83.

FIG. 10 is a schematic diagram showing the motions of the components when the operation member 40 is pushed in in the state where the operation member 40 is tilted in a case where the sheet 85 is not placed on the placement surface 83. As shown in FIG. 10, if the operation member 40 is pushed in in the direction along the shaft portion 131 in the state where the operation member 40 is tilted in the negative x-axis direction, a force in the direction along the shaft portion 131 is generated at the contact point CP between the extremity portion of the protruding portion 43 and the placement surface 83. Since the placement surface 83 is formed parallel to the xy plane, the extremity portion of the protruding portion 43 is unlikely to slide in a direction d3 along the surface of the placement surface 83. In the exemplary embodiment, the sliding properties of the placement surface 83 are lower than those of the sheet 85, and therefore, the extremity portion of the protruding portion 43 is more unlikely to slide than in a case where the sheet is included. Thus, in a case where the sheet 85 is not placed on the placement surface 83, resistance against the push-in force is great, and it is difficult to push in the operation member 40. Also in a case where the sheet 85 of which the front surface is parallel to the xy plane is placed on the placement surface 83, it is similarly difficult to push in the operation member 40.

On the other hand, in a case where the sheet 85 inclined as in the exemplary embodiment is placed on the placement surface 83, a force applied to the contact point CP is dispersed in a direction including a component in the z-axis direction along the front surface of the sheet 85. Thus, even in the state where the operation member 40 is tilted, it is easy to push in the operation member 40 downward.

The inclination angle of the front surface of the sheet 85 relative to the xy plane (the inclination angle relative to a plane perpendicular to the shaft portion 131; α in FIG. 7) may be set in the range from 20 degrees to 70 degrees. The inclination angle α may be set in the range from 30 degrees to 60 degrees. The inclination angle α may be set to the maximum tilt angle θ of the shaft portion 131. The inclination angle α may be set to (90-θ) degrees. The inclination angle α may be set to the range from 0 to (90 degrees-θ). The inclination angle α of the front surface of the sheet 85 may be set to be smaller than the maximum tilt angle θ. For example, if the maximum tilt angle θ is 20 degrees, the inclination angle α of the front surface of the sheet 85 may be set in the range from 10 degrees to 20 degrees. For example, if θ is in the range from 0 degrees to 45 degrees, a may be set in the range from 45 degrees to (90-θ). For example, if 0 is in the range from 45 degrees to 90 degrees, a may be set in the range from (90-θ) to 45 degrees.

Second Exemplary Embodiment

Figure 11:
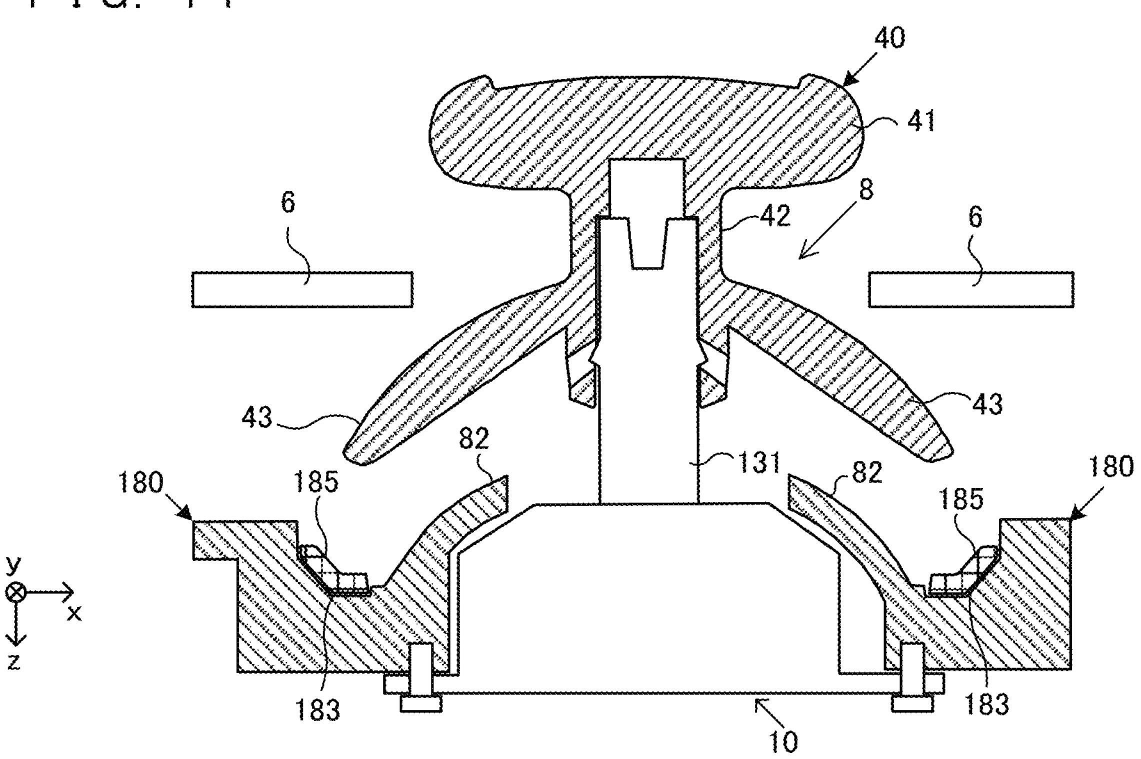
FIG. 11 is an example non-limiting cut section end view of the controller 1 according to a second exemplary embodiment.
Figure 12:
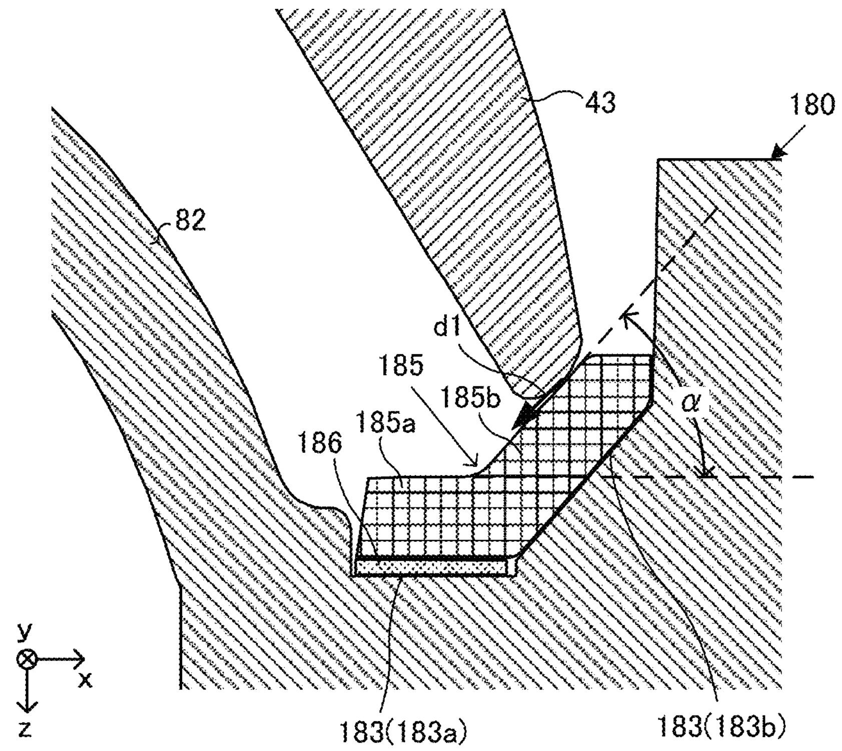
FIG. 12 is an example non-limiting enlarged view of a part of FIG. 11 when the operation member 40 is tilted to the right side.

Next, a second exemplary embodiment is described. FIG. 11 is an example of a cut section end view of the controller 1 according to the second exemplary embodiment. FIG. 12 is an enlarged view of a part of FIG. 11 when the operation member 40 is tilted to the right side. In the second exemplary embodiment, the frame 80 used in the above first exemplary embodiment is replaced with a frame 180. In the second exemplary embodiment, the sheet 85 used in the first exemplary embodiment is replaced with a sheet 185. Components other than the frame 180 and the sheet 185 are similar to those in the above first exemplary embodiment.

The frame 180 includes an annular placement surface 183. The shapes of the placement surfaces of the frame 180 and the frame 80 are different from each other. Specifically, as shown in FIG. 12, the placement surface 183 includes a first placement area 183*a* and a second placement area 183*b* provided on the side further away from the operation member 40 than the first placement area 183*a* (the outer peripheral side of the circle). The first placement area 183*a* is formed to be parallel to the xy plane, and the second placement area 183*b* is formed to be inclined by the inclination angle α relative to the xy plane.

On the placement surface 183, the sheet 185 is placed. The sheet 185 is composed of a material having high sliding properties and wear resistance similarly to the first exemplary embodiment. The sheet 185 is formed into a ring shape. The sheet 185 has almost uniform thickness and has a shape along the placement surface 183. Specifically, the sheet 185 includes an inside portion 185*a* corresponding to the first placement area 183*a* and an outside portion 185*b* corresponding to the second placement area 183*b* in a case where the sheet 185 is placed on the placement surface 183. If the sheet 185 is placed on the placement surface 183, the inside portion 185*a* of the sheet 185 is parallel to the xy plane, and the outside portion 185*b* of the sheet 185 has the inclination angle α relative to the xy plane. That is, the surface of the outside portion 185*b* of the sheet 185 has the inclination angle α relative to the xy plane. To the first placement area 183*a* of the placement surface 183, an adhesive is applied or a double-sided adhesive sheet 186 is attached, and the inside portion 185*a* of the sheet 185 is bonded in the first placement area 183*a*. The adhesive or the adhesive sheet 186 may be provided between the second placement area 183*b* and the outside portion 185*b* of the sheet 185. Neither the adhesive nor the adhesive sheet 186 may be provided between the placement surface 183 and the sheet 185. A latch portion may be provided in the frame 180, and the sheet 185 may be latched by the latch portion. The thickness of the sheet 185 may not be uniform.

As shown in FIG. 12, the surface of the outside portion 185*b* of the sheet 185 is inclined relative to the xy plane to face the operation member 40. For example, if the maximum tilt angle θ of the operation member 40 is 20 degrees, the inclination angle α of the surface of the outside portion 185*b* of the sheet 185 may be in the range from 45 degrees to 70 degrees. For example, the tilt angle α in the second exemplary embodiment may be set in the range from 45 degrees to 55 degrees.

If the operation member 40 is tilted, the protruding portion 43 of the operation member 40 and the sheet 185 come into contact with each other. Specifically, the extremity portion of the protruding portion 43 comes into contact with the surface of the outside portion 185*b* of the sheet 185 having the inclination angle α relative to the xy plane. That is, the outside portion 185*b* of the sheet 185 includes a contact area. This restricts the operation member 40 from being further tilted. As described in the above first exemplary embodiment, if the operation member 40 is pushed in in the state where the operation member 40 is tilted, a force is dispersed in a direction along a front surface of the sheet 185 (a direction toward the operation member 40; a direction d1 in FIG. 12). Thus, the operation member 40 slides on the contact area and moves in the negative x-axis direction and the z-axis direction. Consequently, even in the state where the operation member 40 and the shaft portion 131 tilt, it is possible to easily push down the operation member 40 and the shaft portion 131.

If the operation member 40 is pushed in in the state where the operation member 40 is tilted, the extremity of the protruding portion 43 may be configured not to slide from the outside portion 185*b* to the inside portion 185*a* or configured to slide until the extremity of the protruding portion 43 comes into contact with the inside portion 185*a*. The extremity of the protruding portion 43 slides on the outside portion 185*b* and reaches the inside portion 185*a*, whereby the inside portion 185*a* can receive an excessive push-in force.

As described above, in the second exemplary embodiment, the placement surface 183 (the second placement area 183*b*) has an inclination angle, and the sheet 185 is placed on the placement surface 183. If the operation member 40 tilts, the protruding portion 43 of the operation member 40 comes into contact with a contact area inclined relative to the xy plane (a part of the outside portion 185*b* of the sheet 185). Consequently, it is possible to restrict the operation member 40 from being further tilted, and it is also possible to easily push in the operation member 40 when the operation member 40 is tilted.

As described above, the controller 1 according to the exemplary embodiment includes the analog stick 4, and the analog stick 4 includes a movable member (the operation member 40 and the shaft portion 131). The movable member penetrates through an opening of a front surface of a housing in a first direction (the z-axis direction) from the front surface to the inside of the housing and is configured to be able to be pressed and tilted relative to an axis in the first direction. Inside the housing, a contact area (a part of the front surface of the sheet 85 or 185) that comes into contact with the movable member when the movable member tilts, and restricts the movable member from being further tilted is provided. The contact area is inclined to face the movable member side relative to a plane (the xy plane) perpendicular to the first direction. If the movable member is tilted by a predetermined tilt angle, an extremity portion of the movable member (the extremity portion of the protruding portion 43) and the contact area come into contact with each other in the tilt direction, whereby the movable member is restricted from being further tilted. If the movable member is pushed in in the state where the extremity portion of the movable member is in contact with the contact area, the extremity portion of the movable member slides while being in contact with the contact area.

Consequently, if the movable member is pushed in in the state where the movable member is tilted to the maximum tilt angle, it is possible to prevent great resistance from being generated, and it is possible to easily push in the movable member.

In the exemplary embodiment, a sheet (85 or 185) is placed on a placement surface (83 or 183). The placement surface and the sheet are composed of different materials. The sheet is composed of a material having higher sliding properties and wear resistance than the placement surface. Thus, it is possible to make the sheet and the extremity of the protruding portion 43 unlikely to become worn. The placement surface (83 or 183*a*) is formed parallel to the xy plane, and therefore, it is easy to place the sheet, and it is possible to make a positional shift unlikely to occur when the sheet is attached.

As shown in FIG. 9, if the operation member 40 is pushed in downward in the state where the operation member 40 is tilted, a force to cause the operation member 40 to pivot in a direction d2 with the contact point CP as the pivot point (the direction in which a portion on the opposite side of the contact point CP is lifted) may act depending on the push-in direction. Even in such a case, since the hole portions 46 are formed inside the opening 45 of the operation member 40, and the retention portions 132 of the shaft portion 131 are placed in the hole portions 46, it is possible to make the operation member 40 unlikely to come out of the shaft portion 131. Specifically, the hole portions 46 of the operation member 40 are formed to extend in the push-in direction and the side surface direction of the operation member 40. Thus, even if a force in the direction d2 in FIG. 9 is applied to the operation member 40 when the operation member 40 is pushed in, the retention portions 132 protruding in the push-in direction and the side surface direction of the shaft portion 131 become caught on the hole portion 46, and it is possible to make the operation member 40 unlikely to come out.

In the exemplary embodiment, the stick module 10 is fixed to a frame (80 or 180) in which a sheet (85 or 185) including a contact area that comes into contact with the operation member 40 is provided. Thus, it is possible to reduce the influences of the tolerance of components themselves and the tolerance when the components are assembled. In the exemplary embodiment, the stick module 10 is fastened with screws (fastening members) from the back surface side of the frame. Thus, when the operation member 40 is tilted, it is possible to prevent the protruding portion 43 from interfering with the screws. To bring the extremity portion of the protruding portion 43 and the contact area into contact with each other when the operation member 40 is tilted, for example, it is necessary to prevent the distance between the extremity portion of the protruding portion 43 and the contact area when the operation member 40 is not tilted from being too long by making the protruding portion 43 large or placing the contact area further in the negative z-axis direction. However, the stick module 10 is fixed from the back surface side of the frame, whereby it is possible to shorten the distance between the extremity portion of the protruding portion 43 and the contact area when the operation member 40 is not tilted without making the protruding portion 43 large.

In the exemplary embodiment, the flexible printed circuit board 90 in which the switches 91 for detecting the pressing of the buttons 2 are placed on a front surface of a frame (80 or 180) is provided. The stick module 10 and the flexible printed circuit board 90 are attached to the frame, and therefore, it is possible to reduce the influence of the tolerance more than in a case where these components are fixed to another member. Thus, it is possible to make the heights of the analog stick 4 and the buttons 2 from the front surface of the housing 6 constant.

(Variations)

While the exemplary embodiment has been described above, various variations may be made in another exemplary embodiment.

For example, the cross-sectional shape of a sheet (85 or 185) placed on a placement surface (83 or 183) is merely an example, and may be another shape. For example, in the first exemplary embodiment, the entirety of the front surface of the sheet 85 is formed to have the predetermined inclination angle α relative to the xy plane. In the second exemplary embodiment, the sheet 185 has almost uniform thickness, the surface of the inside portion 185*a* of the sheet 185 is formed parallel to the xy plane, and the surface of the outside portion 185*b* of the sheet 185 is formed to have the predetermined inclination angle α relative to the xy plane. In another exemplary embodiment, for example, a surface of an inside portion of the sheet may be formed parallel to the xy plane, and a surface of an outside portion of the sheet may be formed to have the predetermined inclination angle α relative to the xy plane, and the entirety of a back surface of the sheet may be formed parallel to the xy plane. That is, the inside portion of the sheet may have constant thickness, and the outside portion of the sheet may be formed so that the further away from the movable member the sheet is, the thicker the sheet is. Also in this case, the outside portion of the sheet having the inclination angle α is a contact area with which the movable member comes into contact when the movable member is tilted. The contact area is inclined to face the movable member, and therefore, even in the state where the movable member is tilted, it is easy to push in the movable member.

In the above exemplary embodiment, a sheet (85 or 185) is placed on a placement surface (83 or 183) formed on a frame (80 or 180), thereby forming a contact area having a predetermined inclination angle relative to the plane perpendicular to the shaft portion 131 (the xy plane). In another exemplary embodiment, a sheet may not be placed on a placement surface, and the placement surface itself may form a contact area with which the extremity portion of the protruding portion 43 of the operation member 40 comes into contact. In this case, the placement surface may be formed to have a predetermined inclination angle relative to the plane perpendicular to the shaft portion 131. Specifically, the placement surface may be formed to face the shaft portion 131. In this case, the placement surface having the predetermined inclination angle may be formed of a material having higher sliding properties and wear resistance than a material forming a frame other than the placement surface. For example, the placement surface may be formed of rigid urethane foam or foamed polyethylene, and may be formed of a material having higher sliding properties and wear resistance than the housing 6 or the protruding portion 43 of the operation member 40.

A placement surface may be configured to have a predetermined inclination angle relative to the plane perpendicular to the shaft portion 131, and a planar sheet having greater sliding properties than a frame may be placed on the placement surface. That is, the sheet having substantially constant thickness may be placed on the placement surface having the predetermined inclination angle. The sheet may be a thin material such as a seal. The sheet may be formed by applying a liquid. The placement surface may be configured to have a first inclination angle relative to the plane perpendicular to the shaft portion 131, and the sheet having a second inclination angle may be placed on the placement surface. Also in this case, the sheet may be a material having higher sliding properties than the frame (the placement surface).

In the above exemplary embodiment, a contact area with which the extremity portion of the protruding portion 43 comes into contact is a planar surface. In another exemplary embodiment, the contact area may be a curved surface. The extremity portion of the protruding portion 43 may have a rounded shape, or may have a planar shape.

In the above exemplary embodiment, a frame is formed of a resin material, and the flexible printed circuit board 90 is placed on the frame. In another exemplary embodiment, the frame may be formed of any material. For example, the frame may be a circuit substrate, and the stick module 10 may be attached to the substrate. On the substrate, a sheet including a contact area with which the operation member 40 comes into contact when the operation member 40 is tilted is provided.

In the above exemplary embodiment, the operation member 40 is detachably attached to the shaft portion 131 of the stick module 10, and the operation member 40 and the shaft portion 131 are configured as a movable member to be able to be tilted by an operation of the user. In another exemplary embodiment, the movable member is not limited to such a configuration. For example, the movable member may be obtained by integrally forming the operation member 40 and the shaft portion 131. For example, the integrally formed movable member may include the protruding portion 43, and if the movable member is tilted, the extremity portion of the protruding portion 43 may come into contact with a contact area provided inside the housing 6 in the tilt direction, thereby restricting the tilt of the movable member. The movable member may be configured to be able to be separate from a stick module that detects the tilt direction.

A movable member may be configured integrally with a stick module. For example, the shaft portion 131 may extend upward (in the negative z-axis direction) from a housing of the stick module, and the umbrella-shaped protruding portion 43 may be provided to protrude downward (in the z-axis direction) and the side surface direction from the shaft portion 131. Further, the key top 41 that is touched by the user (via or not via the shaft portion 42) may be provided above the protruding portion 43, or the key top 41 may not be provided.

In the above exemplary embodiment, the operation member 40 includes the key top 41, the shaft portion 42, and the protruding portion 43. In the operation member 40, these portions may be integrally formed. The operation member 40 may be configured by combining a plurality of members forming each of the key top 41, the shaft portion 42, and the protruding portion 43. The operation member 40 may be configured by further combining another member in addition to the plurality of members.

The operation member 40 may be provided at any position so long as the operation member 40 can be operated by the user at the position. For example, in the above exemplary embodiment, the entirety of the key top 41 of the operation member 40 is exposed through the opening 8 of the housing 6 (FIG. 7). In another exemplary embodiment, a part of the key top 41 may be exposed through the opening 8, and another part of the key top 41 may enter into the opening 8 or the housing 6. A part of the protruding portion 43 of the operation member 40 may be exposed through the opening 8. The entirety of the protruding portion 43 may be exposed through the opening 8 when the operation member 40 is not tilted.

The shape of the movable member in the above exemplary embodiment is merely an example, and the movable member may have any shape. For example, in the above exemplary embodiment, the hole portions 46 are formed in the shaft lower portion 42*b* of the shaft portion 42 (an insertion opening), and the retention portions 132 (projections) provided in the shaft portion 131 (an insertion portion) are inserted into the hole portions 46, thereby making the operation member 40 unlikely to come out of the shaft portion 131. In another exemplary embodiment, the movable member may include an operation surface (e.g., the key top 41) that is operated by the user, a first component (e.g., the shaft portion 42) including an insertion opening on the opposite side of the operation surface, and a second component (e.g., the shaft portion 131) including an insertion portion that is inserted into the insertion opening. Then, a protrusion may be provided in either one of the insertion portion and the insertion opening, and a hole portion into which the protrusion is inserted may be provided in the other. For example, the hole portion may be provided in the shaft portion 131, and the protrusion that is engaged with the hole portion may be provided in the shaft lower portion 42*b* of the shaft portion 42. In another exemplary embodiment, the shaft lower portion 42*b* may not be formed. In this case, the hole portions 46 may be provided on the inner walls of the shaft portion 42. The shape of the protruding portion 43 may not be limited to semispherical, and may be any shape. For example, the protruding portion 43 may have a shape in which the protruding portion 43 extends in an approximately straight line in the side surface direction from the shaft portion 42 and bends downward in the middle.

On the front surface or back surface side of a sheet (85 or 185), a sensor that senses contact or pressure may be provided. The sheet itself may be composed of such a sensor.

Although in the above exemplary embodiment, the stick module 10 is fixed to a frame (80 or 180) with screws, the method for fixing the stick module 10 is not limited to this. For example, the stick module 10 may be fixed to the frame using solder or an adhesive. The stick module 10 may be fixed to a front surface of the frame. The stick module 10 may be fixed not only to the frame, but also to a back surface of the housing 6, for example.

In the above exemplary embodiment, the stick module 10 is configured to be able to be tilted and pushed in and is attached to a frame (80 or 180) from the back surface side. In another exemplary embodiment, a stick module that cannot be pushed in may be attached to a frame. Specifically, a controller according to another exemplary embodiment includes a housing including an opening, a stick module including a movable member exposed through the opening, and a frame provided inside the housing. The movable member is configured to be able to be tilted relative to a predetermined axis, and configured to be unable to be pushed in. In the frame, a contact area with which the extremity portion of the protruding portion 43 of the movable member comes into contact is provided. The contact area may be configured to be inclined relative to a plane perpendicular to a predetermined axis, or may be configured to be parallel relative to the perpendicular plane. The frame including such a contact area is provided inside the housing, and the extremity of the protruding portion 43 of the movable member comes into contact with the contact area, thereby restricting the tilt of the movable member. In the frame, an opening penetrating through the shaft portion 131 of the stick module is provided, and the stick module is attached from the back surface side of the frame so that the shaft portion 131 of the stick module penetrates through the opening from the back surface to a front surface of the frame (i.e., from a back surface to a front surface of the housing).

Although in the above exemplary embodiment, the spring 170 is configured to push back the operation member 40 and the lever 130, another configuration may be employed. For example, a configuration may be employed in which the restoring force of the switch portion 161 itself pushes back the pressing portion 150, thereby pushing back the operation member 40 and the lever 130.

In the above exemplary embodiment, a sheet (85 or 185) including a contact area that comes into contact with the protruding portion 43 of the operation member 40 is provided on a frame (80 or 180) on which the flexible printed circuit board 90 is placed. In another exemplary embodiment, the contact area may not be provided on the frame so long as the contact area is formed inside the housing 6. For example, an inner surface of the housing may include the contact area. Alternatively, a member including the contact area and different from the frame may be provided inside the housing. This member may be formed of a material having high sliding properties and wear resistance.

The structure of the above analog stick may be applied not only to the controller 1 held by both hands of the user, but also to any other controller. For example, the above analog stick may be provided in a controller held by one hand of the user. The structure of the above analog stick may be applied to a controller placed on a predetermined surface. For example, the structure of the above analog stick may be applied to a controller of an arcade game apparatus. The analog stick provided in any controller includes a movable member. The movable member is configured to be able to be tilted relative to an axis in a direction from a front surface to the inside of a housing, and is also configured to be able to be pushed in in the axis direction. Inside the housing, a contact area that comes into contact with the movable member of the analog stick when the movable member is tilted is provided. Specifically, if the movable member is tilted, the movable member and the contact area come into contact with each other in the tilt direction. The contact area is configured to be inclined by a predetermined inclination angle relative to a plane perpendicular to the above axis.

The structure of the stick module is not limited to the above. For example, in the above exemplary embodiment, the stick module 10 pivots with the shaft portion 121 of the actuator 120 as the pivot point, thereby being pushed downward. The structure of the stick module 10 is not limited to this. For example, the stick module 10 may be configured so that if the stick module 10 is pushed in when the stick module 10 is not tilted, the shaft portion 131 and the actuator 120 move directly downward (in the z-axis direction) overall, and also if the stick module 10 is pushed in when the stick module 10 is tilted, the shaft portion 131 and the actuator 120 move directly downward overall. The stick module 10 may be configured so that if the stick module 10 is pushed in when the stick module 10 is not tilted, the shaft portion 131 moves in the direction along the shaft portion 131, and also if the stick module 10 is pushed in when the stick module 10 is tilted, the shaft portion 131 moves in the direction along the shaft portion 131.

In the above exemplary embodiment, the analog stick 4 includes the shaft portion 42 and the shaft portion 131, and the shaft portion 42 and the shaft portion 131 are tilted, whereby an input direction is detected. In another exemplary embodiment, a direction input device that does not include the shaft portion 42 and the shaft portion 131 may be used. For example, a direction input device that can tilt by a key top sliding on a sliding contact surface forming a tilt trajectory may be used.

While the exemplary embodiment has been described, the above description is merely illustrative, and the exemplary embodiment may be improved and modified in various manners. The configurations of the above exemplary embodiment and its variations can be optionally combined together unless they contradict each other.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A controller comprising:

a housing including an opening in a front surface of the housing;

an input device including a movable member penetrating through the opening from inside of the housing to the front surface side in a first direction and configured to be pressed and tilted relative to an axis in the first direction;

a contact area that is provided inside the housing, and when the movable member is tilted, comes into contact with the movable member, thereby restricting the movable member from being further tilted; and a frame provided inside the housing and fixing the input device, wherein the contact area is inclined toward the movable member side relative to a plane perpendicular to the first direction, the input device is fixed to a back surface of the frame so that the movable member penetrates through an opening of the frame, the frame includes an annular recessed portion, and the contact area is in the recessed portion.

2. The controller according to claim 1, wherein the contact area is in the frame or a member fixed to the frame.

3. The controller according to claim 1, wherein the frame includes a wall portion extending from a back surface side to a front surface side of the frame to form a part of the recessed portion.

4. The controller according to claim 3, wherein the input device includes an operation member, at least a part of which is exposed from the housing, and a stick module provided inside the housing, and at least a part of the stick module is accommodated in a space on a back surface side of the wall portion.

5. The controller according to claim 3, wherein when the movable member tilts, the movable member does not come into contact with the wall portion.

6. The controller according to claim 3, wherein a fixing portion fixing the input device and the frame is between an extremity on a front surface side of the wall portion and the contact area in a second direction perpendicular to the first direction.

7. The controller according to claim 1, wherein a printed circuit board is placed on a surface on a front side of the frame.

8. The controller according to claim 7, further comprising:

a button exposed from the front surface of the housing; and a switch that detects pressing of the button, wherein the switch is provided on the printed circuit board, and the switch is placed further on the front surface side of the housing than a bottom of the recessed portion.

9. The controller according to claim 1, further comprising:

a first member including the contact area on a front surface of the first member, wherein the frame includes a placement area where the first member is placed on a front surface of the second member, and an inclination angle of the placement area is smaller than an inclination angle of the contact area relative to the plane perpendicular to the first direction.

10. The controller according to claim 9, wherein the placement area is parallel to the plane perpendicular to the first direction.

11. The controller according to claim 1, further comprising:

a first member including the contact area on a front surface of the first member, wherein the frame includes a placement area where the first member is placed on a front surface of the second member, and the further away from the movable member a portion of the first member having the contact area is, the thicker the portion is.

12. The controller according to claim 1, further comprising:

a first member including the contact area on a front surface of the first member, wherein the frame includes a placement area where the first member is placed on a front surface of the second member, the placement area includes a first placement area provided on the movable member side and a second placement area provided on a side further away from the movable member than the first placement area, and an inclination angle of the first placement area is smaller than an inclination angle of the second placement area relative to the plane perpendicular to the first direction.

13. The controller according to claim 12, wherein the first member is bonded to the frame in the first placement area.

14. The controller according to claim 12, wherein the first placement area is parallel to the plane perpendicular to the first direction.

15. The controller according to claim 12, wherein the first member includes the contact area on a surface of a portion placed in the second placement area.

16. The controller according to claim 1, wherein the input device is fastened to the back surface of the frame with a fastening member.

17. The controller according to claim 1, wherein the movable member includes a first component including an operation surface that is operated by a user and an insertion opening on an opposite side of the operation surface, and a second component including an insertion portion that is inserted into the insertion opening, and one of the insertion portion and the insertion opening includes a protrusion, and the other includes a hole portion into which the protrusion is inserted.

18. The controller according to claim 17, wherein the insertion opening includes the hole portion, and the hole portion is formed so that the further in a direction opposite to the first direction the hole portion is, the further in a direction away from the movable member the hole portion extends.

19. The controller according to claim 1, wherein the movable member includes a shaft portion, and a protruding portion protruding from the shaft portion, and the protruding portion protrudes in a direction away from the shaft portion inside the housing, and comes into contact with the contact area when the movable member is tilted.

20. The controller according to claim 19, wherein the further in a direction opposite to the first direction the protruding portion is, the further in a direction away from the shaft portion the protruding portion extends.

* * * * *